United States Patent [19]

Takahashi et al.

[11] 3,897,374

[45] July 29, 1975

[54] NONSTAINING RUBBER

[75] Inventors: Masaaki Takahashi, Tokyo; Noboru Ishizawa, Hyogo; Masazo Nishida, Osaka, all of Japan

[73] Assignees: The Toyo Rubber Industry Co., Ltd., Osaka; Kureha Kagaku Kogyo Kabushiki Kaisha, Tokyo, both of Japan; part interest to each

[22] Filed: Jan. 4, 1974

[21] Appl. No.: 430,852

Related U.S. Application Data

[63] Continuation-in-part of Ser. No. 153,047, June 14, 1971, abandoned.

[30] Foreign Application Priority Data

June 12, 1970  Japan.................................. 45-51196

[52] U.S. Cl................ 260/5; 208/14; 260/33.6 AQ; 260/668 R
[51] Int. Cl....................... C07c 15/24; C08c 11/22
[58] Field of Search................ 260/33.6 AQ, 668, 5; 208/14

[56]  References Cited
UNITED STATES PATENTS 3,681,279  8/1972  Mills et al................... 260/33.6 AQ

OTHER PUBLICATIONS

Kirk–Othmer "Encyclopedia of Chemical Techn." (2nd Ed.) (Vol. 14) (Interscience) (N.Y.) (1967), pages 849–850, 853, 854. TP9E68.

White et al., Rubber Journal, pages 50–52 and 55 (June 1966).

*Primary Examiner*—Donald E. Czaja
*Assistant Examiner*—H. H. Fletcher
*Attorney, Agent, or Firm*—Sughrue, Rothwell, Mion, Zinn & Macpeak

[57] ABSTRACT

A rubber composition is provided having nonstaining property containing therein 5-50 PHR of a novel nonstaining aromatic hydrocarbon process oil comprising polypropylnaphthalene.

The process oil comprises polypropylnaphthalene of the general formula:

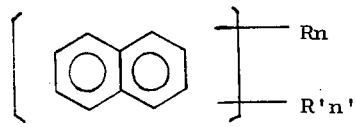

wherein R is propyl group, $n$ is an integer of 2 to 4, R' is a hydrogen atom or a methyl group and $n'$ is an integer of 0 to 2, the total number of carbon atoms in the alkyl side chains being six to 13, and has an aniline point of not more than 10°C. It is suitable for the uses of light color rubber compositions with no staining and bleeding.

11 Claims, No Drawings

NONSTAINING RUBBER

CROSS REFERENCE TO RELATED APPLICATIONS

The application is a continuation-in-part application of copending application, Ser. No. 153,047, filed June 14, 1971, now abandoned.

BACKGROUND OF THE INVENTION

1. Field of the Invention

This invention relates to a nonstaining rubber composition containing therein 5–50 PHR (parts per hundred rubber) of an aromatic hydrocarbon process oil having an aniline point of not more than 10°C which comprises polypropylnaphthalene.

2. Description of the Prior Art

Heretofore, petroleum oil softening agent or process oil has been employed for the purposes of enhancing processability of a rubber composition owing to its plasticization effect and reduction in cost. Particularly, a large amount extending from 25 to 50 parts by weight, per 100 parts by weight of rubber, of petroleum oil softening agent has been employed for styrene-butadiene copolymers of solution-polymerized polybutadiene.

Most of the petroleum oils which have hitherto been employed are so-called aromatic extender oils, which may be advantageously compounded in a rubber composition in a large amount, but impart staining and light discoloring to a rubber composition.

On the other hand, naphthenic extender oils have also been employed, as less or nonstaining softening agents in rubber compositions.

The compounding amount of naphthenic oil was however, fairly limited because the compounds are likely to bleed on a surface of the rubber composition when they are used in large amounts which leads to staining of rubber. U.S. Pat. No. 3,681,279 discloses an attempt in the preparation of a nonstaining oil by eliminating the above defects in naphthenic oils and aromatic oils. However, this patent relates to a preparation of an oil containing 45 to 85% aromatic oil by using a naphthenic distillate as a starting material and by subjecting it to a hydrorefining and dehydrogenation-aromatization for eliminating polar compounds. Therefore, the product according to the process of this patent contains 15–55% non-aromatic hydrocarbons, i.e., saturated hydrocarbons. Thus, there is no disclosure therein with respect to the fact that 100% aromatic compound is useful to achieve nonstaining properties.

The present invention has been accomplished to solve the prior art defects or drawbacks, as above, in softening agents for rubber.

SUMMARY OF THE INVENTION

According to the invention, there is thus provided a rubber composition containing therein a novel aromatic hydrocarbon process oil comprising polypropylnaphthalene, which oil has an aniline point of not more than 10°C, preferably not more than −5°C and exhibits no staining property when compounded with a rubber composition.

This finding is unexpected in view of conventional ideas or knowledge that usual aromatic oils currently used have aniline points in a range of from 25° to 40°C, and the lower the aniline point is the more increased is the staining property.

Thus, the rubber composition with which the present invention is concerned may be suitably used, as for example, for light color rubber compositions for white ribbons of tires, or black color rubber compositions in contact with light color rubber compositions. The compositions also have application in fields where rubber compositions compounded with a large amount of a softening agent have been believed not to be desirable, for example, in tire carcasses, canvas shoe soles, etc. Further, it is greatly expected that the rubber composition of this invention will be applied in new fields, such as colored tires or patterned tires.

DETAILED DESCRIPTION OF THE INVENTION

The process oil to be used in a rubber composition with which the present invention is concerned may be prepared, for instance, by the following procedure:

Naphthalene or naphthalene fraction (generally, a 200° to 250°C fraction) obtained from a raw material is alkylated, if necessary after hydrorefining, with a lower olefin compound, particularly propylene to yield a fraction having a boiling point range of 280° to 450°C, preferably 300° to 400°C. Thus, the process oil used in the present invention is obtained. The raw material used herein includes a naphthalene fraction obtained by distilling a heavy oil which is obtained by treating a petroleum hydrocarbon at 700° to 2,300°C for 1 to 0.001 second, a naphthalene fraction separated from coal tar, a naphthalene fraction in a by-produced bottom oil obtained in the catalytic improvement of naphtha, etc.

The above process oil comprising polypropylnaphthalene obtained in the present invention is quite different from the conventional process oil generally obtained by the purification and separation of a mineral oil. That is, the process oil of the present invention contains no carbon bonding constituting a naphthene ring, and is an oil fraction composed of pure aromatic hydrocarbons. Therefore, the conventional manner for analyzing the component (such as n-d-M method, V.G.C. method, which are calculated from the measurement of physical constants) is not applied, and it was confirmed by gas chromatography, NMR, mass spectrum, etc., that the process oil comprises a naphthalene compound having two to four propyl groups, such as, dipropyl-naphthalene, tetrapropylnaphthalene, etc.

Isomers thereof are of course included, but in the present invention it is not necessary to separate the isomers. Any compounds represented by the above general formula having a boiling point range of 280° to 450°C can be employed. The reason for specifying the general formula of the compounds according to the present invention is based on the considerations of methylnaphthalene and dimethylnaphthalene contained in a naphthalene fraction, and even though those propyl compounds are contained in the process oil, there is no problem in practicing the present invention.

The physical properties of polypropylnaphthalene oil of the present invention are generally as follows.

| | |
|---|---|
| Boiling Point | 300 – 400°C |
| Specific Gravity ($d_4^{15}$) | 0.94 – 1.000 |

-Continued

| | |
|---|---|
| Reflectance ($N_D^{20}$) | 1.54 – 1.58 |
| Flash Point | 160°C< |
| Pour Point | not more than –5°C |
| Saybolt Universal Viscosity (100°F) | 20 – 100 |
| Aniline Point | not more than 10°C, preferably not more than –5°C |

Table 1 given below shows the performance on one of the process oils employed in the examples of the present invention, as compared with those of typical process oils now commercially available.

TABLE 1

Performances of Various Process Oils

| Process Oil<br>Item | Conventional Paraffinic Oil | Conventional Naphthenic Oil | Conventional Aromatic Oil | Article of the Invention |
|---|---|---|---|---|
| Specific Gravity ($d_4$) | 0.8735 | 0.8859 | 1.0065 | 0.9677 |
| Aniline point (°C.) | 99.7 | 70.0 | 34.1 | –10.0 |
| Reflectance ($N_D^{20}$) | 1.4794 | 1.5068 | 1.5715 | 1.5654 |
| Color (ASTMD-1500) | 1.0 | 3.7 | 3.0 | 1.0 |
| VGC* | 0.805 | 0.8789 | 0.9561 | 1.082 |

Remark VGC (Viscosity gravity constant) = $\dfrac{G-0.24-0.22 \log(V-35.5)}{0.755}$ In the above equation, G symbolizes the specific gravity at 60°F. and V symbolizes the Saybolt universal viscosity at 210°F.

As is apparent from Table 1 above, the process oil for use in the present invention is characterized in that its aniline point is fairly low with high aromaticity.

The rubber component, with which the process oil for use in the present invention having the above mentioned good properties may be compounded, includes any kind of elastic high polymers, such as, natural rubbers or synthetic rubbers. The synthetic rubbers are exemplified by styrene-butadiene copolymers obtained by emulsion polymerization, butadiene-acrylonitrile copolymers, polybutadiene, styrene-butadiene copolymers, obtained by solution polymerization, polybutadiene, neoprene, polyisoprene, styrene-butadiene copolymers, or butadiene-acrylonitrile copolymers, prepared by alfin catalyst polymerization.

In particular, polymers having high polarity and great cohesive energy between main chains, for example styrene-butadiene copolymer, butadiene-acrylonitrile copolymer, or neoprene have strong affinity for and swell readily in the process oil of the present invention so that it is possible to incorporate the process oil in the polymer in a larger amount.

The rubber compositions containing the specified process oil to which the present invention relates is nonstaining and bleeding or blooming phenomena do not tend to be caused by the process oil migrating of diffusing towards the surface of the rubber composition article. Also the rubber compositions are not at all degraded in mechanical properties, such as, tensile strength.

Moreover, it should be remarked that the rubber composition or compound has good processability, for example, tackiness and adhesiveness.

In particular, the use of the rubber composition is effective for the improvement in adhesion to polyester, nylon or steel cord.

It was generally required that various light color or white rubber articles, for example white ribbons for tires, not only do not stain, but also can maintain their whiteness from the viewpoint of commercial value, whereas it has been a general tendency in recently that a large amount of a process oil is compounded with rubber in rubber compounding, which tendency often leads to rubber staining due to the large amount of the process oil.

In accordance with the invention, such requirement as above can be satisfied by the use of the process oil as specified hereinbefore.

Thus, the rubber compound containing the particular process oil of the invention is characterized in that there is no danger that the oil either discolors a light colored compound or transfers from a black rubber compound to a light colored or white compound adjacent thereto, and, as a result, discolors the latter.

In other words, the process oil for use in the invention has substantially no bleeding nor blooming tendency and can keep a clear color.

The compounding amount of the process oil for proving the rubber compound of the present invention is suitably in a range of from 5 to 50 PHR. When the amount is less than 5 PHR, the inherent effect of the process oil on the rubber, i.e., improving processability, cannot be developed, while when the amount is in excess of 50 PHR, an adverse influence may be exerted upon the properties of the rubber itself.

In compounding operations, other usual ingredients of the rubber industry may also be incorporated as desired. Further the process oil of the invention may be used in combination with a minor proportion of a commercially available process oil.

The preparation of the rubber composition of the present invention may be accomplished, for example, by a procedure of producing a so-called oil-extended rubber which comprises mixing the specified process oil in emulsified form with a copolymer rubber latex, coaqulating the mixture by a salt or acid and drying the resultant rubber composition, or by an orthodox procedure by means of a mixing apparatus, such as a Banbury mixer or open mill. In the former procedure, it may be advantageous to further add carbon black on extending the rubber with oil to prepare a masterbatch rubber. It is to be understood that any procedure for preparing a rubber composition may be conducted.

The following examples in which, unless otherwise stated, % and parts are both by weight, will illustrate the embodiments of the invention in more detail.

EXAMPLE 1

A polymer having a Mooney viscosity of 120 was prepared by the polymerization of 72% butadiene with 28% styrene at 5°F using a 5% potash soap solution as emulsifier so that convention rate is 75%. To the resulting polymer latex was added and mixed thoroughly polypropylnaphthalene in an emulsified form, which polypropylnaphthalene had been prepared by cracking a petroleum oil hydrocarbon at a high temperature of 1,000°C to yield a naphthalene fraction having a boiling point range of 200° to 250°C, hydrotreating the distillate in the presence of a cobaltmolybdenum catalyst and concurrently purifying it, and reacting the hydrotreated product with propylene in the presence of a silica-aluminum catalyst. The process oil is mainly composed of tripropylnaphthalene having a boiling point range extending from 330° to 380°C and an aniline point of −8°C, and is hereinafter abbreviated as "AX-1". Here, an emulsifier comprising 2 parts of oleinic acid and 2 parts of ammonium hydroxide per 100 parts of the process oil was used for the emulsification of the oil.

The mixture so prepared was flocculated by a salt or acid to obtain a product in small particle form, which product was then dried, milled on an open roll mill and formed into a thick sheet by a sheeting step. The thus obtained product comprised of the mixture is hereinafter abbreviated as "PAX." The mixture "PAX" comprises 100 parts of the polymer and 37.5 parts of the process oil and has a Mooney viscosity value of 55.

By way of comparison, a commercially available napthenic oil-extended rubber, as shown in Table 2 below, was employed as the rubber component. The thus prepared mixture "PAX" (this invention) and the commercially available naphthenic oil-extended rubber (comparative) were compounded and mixed respectively with the ingredients as listed in compounding formulae of Table 2, i.e., in accordance with Compound No. II for the former and Compound No. I for the latter by means of Banbury mixer in which the process oil for use in the present invention (Abbr. AX-1) for the former and a commercially available naphthenic process oil (Abbr. NA) for the latter were employed respectively as softening agents. Thus, both rubber compounds were prepared. The various properties of the rubber composition, uncured, and cured, obtained in accordance with the present invention are shown in Table 3 and Table 4 in contradistinction to those of the comparative composition.

TABLE 2

| Compounding Agent | No. | (parts by weight) Compound I (Comparative) | | Compound II (This Invention) | |
|---|---|---|---|---|---|
| JSR-SBR 1778N | *1 | | 103.25 | PAX | 103.25 |
| RSS No. 3(NR) | *2 | | 25.00 | | 25.00 |
| FEF carbon black | *3 | | 60.00 | | 60.00 |
| Active Calcium Carbonate ("Hakuenka CC") | | | 20.00 | | 20.00 |
| Stearic acid | | | 2.00 | | 2.00 |
| Zinc oxide | | | 3.50 | | 3.50 |
| "Picopale 100-SF" | *4 | | 3.00 | | 3.00 |
| Process oil | *5 | NA | 10.00 | AX-1 | 10.00 |
| Antioxidant (WS) | *6 | | 1.50 | | 1.50 |
| Accelerator (CZ) | *7 | | 1.50 | | 1.50 |
| Sulfur | | | 2.50 | | 2.50 |

Remarks:

*1: Oil-extended rubber having a Mooney viscosity value of 100°C. ($ML_{1+4}$) of 48 composed of a styrene-butadiene copolymer rubber with a styrene content of 23.5% and 37.5 PHR of a nonstaining naphthenic process oil.

*2: Natural Rubber Smoked Sheet No. 3.

*3: Fast Extrusion Furnace Carbon Black

*4: Polyolefin Tackifier

*5: NA is a naphthenic process oil "Sonic R-50" and AX-1 is the polypropylnaphthalene of this invention.

*6: Styrenated phenol

*7: N-cyclohexyl-2-benzothiazolesulphenamide

TABLE 3

Properties of Green Sheet

| | | Compound I (Comparative) | Compound II (This Invention) |
|---|---|---|---|
| Mooney viscosity ($ML_{1+4}$ at 100°C.) | | 25 | 26.5 |
| Mooney scorch time (5 unit rise time at 125°C.) | | 25'15" | 24'30" |
| Strength (Kg/cm$^2$) (speed: 50 mm/min) | (23°C.) | 1.21 | 1.28 |
| | (40°C.) | 0.52 | 0.85 |
| Tackiness (Kg) (speed by Pick-up method: 1000 mm/min) | (23°C.) | 2.32 | 2.01 |
| | (40°C.) | 1.12 | 1.78 |

TABLE 4

Properties of Vulcanizate*

*The vulcanizate was obtained under a press vulcanization condition of 150°C. for 40 minutes from the green counterpart.

| | Compound I (Comparative) | Compound II (This Invention) |
|---|---|---|
| Modulus at 300% elongation (Kg/cm$^2$) | 56 | 58 |
| Tensile strength (Kg/cm$^2$) | 164 | 172 |
| Elongation at break (%) | 550 | 570 |
| Tear strength (Kg/cm) | 46 | 54 |
| Shore hardness | 48 | 49 |
| Bound elasticity (25°C.) | 60 | 58 |
| H-test (Kg/cm) (adhesion to nylon 1260 d/2) | 12.5 | 13.8 |
| Contact staining property (Exposure to a Weatherometer for 48 hours at 65°C.) | none | none |

EXAMPLE 2

A process oil was prepared by cracking crude oil at a temperature of 1,200°C. to yield a naphthalene fraction having a boiling point range of 200° to 250°C., hydrotreating the distillate in the presence of a cobalt-molybdenum catalyst and reacting the hydrotreated product with propylene in the presence of silica-aluminum catalyst. The thus-obtained process oil is of polypropylnapthlene mainly composed of tripropylnaphthlene and tetrapropylnaphthlene (the weight ratio being 1:1) having a boiling point range of 350°400°C. and aniline point of −10.5°C. and is hereinafter abbreviated as "AX-2".

The rubber composition (Abbreviation: PAX-2) was prepared in a similar manner to Example 1 in accordance with the white carbon compounding formula shown in Table 5 below using the process oil (AX-2).

TABLE 5

| | (Unit Parts by weight) |
|---|---|
| SBR 1502* | 65.0 |
| RSS No. 1 (NR) | 35.0 |
| Zinc oxide | 3.5 |
| Stearic acid | 1.5 |
| Titanium oxide (Titan White) | 15.0 |
| Active Calcium Carbonate("Hakuenka CC") | 50.0 |
| Hard clay | 30.0 |
| Silica VN3 | 20.0 |
| Diethylene glycol | 1.5 |
| Antioxidant WS | 1.5 |
| Accelerator DM | 1.2 |
| Accelerator TS | 0.2 |
| Sulfur | 2.3 |
| Process oil "AX-2" | 20.0 |

Remarks:
*Nonstaining styrene-butadiene copolymer having styrene content of 23.5%.

By way of comparison, comparative rubber compositions (Abbreviations: PA, PB and PD) were also prepared in a similar manner to the above formula, except that a commercially available, nonstaining, naphthenic oil (Abbrv. A for PA) or a commercially available, staining aromatic oil (Abbr. B for PB) was used as the process oil instead of PAX-2 as in the present invention, and no process oil was used (for PD).

Vulcanization was conducted at 145°C. for 40 minutes.

The resultant vulcanizates were subjected to accelerated weathering tests with a weatherometer to determine discoloration degree.

The results are shown in Table 6 below.

TABLE 6

Discoloration degree by weatherometer exposure (%)

|  | Comparative | | | This Invention |
|---|---|---|---|---|
|  | PA | PB | PD | PAX-2 |
| Before exposure | 83.0 | 83.0 | 84.5 | 83.0 |
| After exposure | 60.5 | 48.0 | 74.0 | 65.0 |

Remarks:
(1) Weatherometer exposure condition was at 69°C. (temperature of black panel) for 24 hours with no showering.
(2) Discoloration degree of each of the specimens exposed to weatherometer was measured by means of a GP-2 type photometer (manufactured by Murakami Shikisai Kenkyusho) and evaluated on the basis of a standard white panel of magnesium oxide, of which whiteness degree is 84.5%.

EXAMPLE 3

The process oils of this invention and the comparatives, the same as those used in Example 2, were compared with each other with regard to discoloration by oil bleed.

First, corresponding black rubber compounds (PPA, PPB, PPAX-2) were prepared respectively from the process oils (A, B, AX-2) in accordance with the compounding formula shown in Table 7 below.

Also, the black compound with no process oil was prepared (PPD).

Further, a white rubber compound was prepared according to the compounding formula as shown in Table 8 below (PW).

Then the white compound in sheet form having a thickness of ca.1 mm was superimposed on each of the black compounds in sheet form and vulcanized at 145°C. for 40 minutes.

Thus, the corresponding composite vulcanizates were obtained.

TABLE 7

Black Compound

|  | (parts by weight) | | | |
|---|---|---|---|---|
|  | PPA | PPB | PPD | PPAX-2 |
| SBR-1502 | 100 | 100 | 100 | 100 |
| FEF Carbon black | 50 | 50 | 50 | 50 |
| Zinc oxide | 3.5 | 3.5 | 3.5 | 3.5 |
| Stearic acid | 1.5 | 1.5 | 1.5 | 1.5 |
| Antioxidant (WS) | 1.0 | 1.0 | 1.0 | 1.0 |
| Accelerator (CZ) | 1.2 | 1.2 | 1.2 | 1.2 |
| 90% non-soluble sulfur | 2.2 | 2.2 | 2.2 | 2.2 |
| Picopale 100-SF | 3.0 | 3.0 | 3.0 | 3.0 |
| Process oil | A | B |  | AX-2 |
|  | 25.0 | 25.0 |  | 25.0 |

TABLE 8

White Compound

|  | (parts by weight) |
|---|---|
|  | PW |
| RSS No. 1 (NR) | 100.0 |
| Zinc oxide | 7.0 |
| Titanium oxide (Titan White) | 40.0 |
| Calcium carbonate ("Hakuenka CC") | 20.0 |
| Stearic acid | 1.5 |
| Paraffin oil | 5.0 |
| Microcystalline wax | 2.0 |
| Coumaron resin | 2.0 |
| Accelerator MSA | 1.2 |
| 90% non-soluble sulfur | 3.0 |

Thereafter the vulcanized composite article irradiated by light on the white part thereof was measured with a color meter to determine degree of discoloration in a similar manner to Example 2.

The results are shown in Table 9 below, by evaluating from the viewpoint of process oil bleed.

TABLE 9

Degree of discoloration by oil shift (%) by weatherometer exposure test.

|  | PPA | PPB | PPD | PPAX-2 |
|---|---|---|---|---|
| Before Exposure | 80 | 80 | 80 | 80 |
| After Exposure | 62 | 45.5 | 75 | 66.5 |

As is apparent from the results, the rubber composition of the present invention has a markedly superior nonstaining property, as well as physical properties to those of prior art rubber compositions.

While the invention has been described in detail and with reference to specific embodiments thereof, it will be apparent to one skilled in the art that various changes and modifications can be made therein without departing from the sprit and scope thereof.

What is claimed is:

1. A rubber composition containing therein 5–50 parts by weight per 100 parts by weight of a rubber component, of a nonstaining aromatic hydrocarbon oil which consists essentially of polypropylnaphthalene of the general formula,

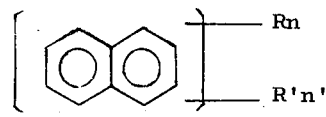

wherein R is propyl group, n is an integer of 2 to 4, R' is a hydrogen atom or a methyl group and n' is an integer of 1 and 2, the total number of carbon atoms is the alkyl side chains being six to 13, and said oil having an aniline point of not more than 10°C and a boiling point ranging from 280° to 450°C.

2. A rubber composition as claimed in claim 1, wherein the amount of said nonstaining aromatic hydrocarbon oil is in a range of 10 to 25 parts by weight per 100 parts by weight of the rubber component.

3. A rubber composition as claimed in claim 1, wherein said aniline point is not more than −5°C.

4. A rubber composition as claimed in claim 1, wherein said aromatic hydrocarbon oil has a boiling point in the range of 300°–400°C.

5. A rubber composition as claimed in claim 1, wherein said polypropylnaphthalene is tripropylnaphthalene.

6. A rubber composition as claimed in claim 5, wherein said polypropylnaphthalene is a mixture of tri- and tetrapropylnaphthalene.

7. A rubber composition as claimed in claim 1, wherein the rubber component is a high polarity rubber having high cohesive energy between molecules selected from the group consisting of styrenebutadiene copolymer, butadiene-acrylonitrile copolymer, neoprene and blends thereof with other polymers.

8. A rubber composition as claimed in claim 7, wherein the rubber component is a styrene-butadiene copolymer or a blend thereof consisting of a major proportion of styrene-butadiene copolymer and a minor proportion of natural rubber.

9. A rubber composition as claimed in claim 1, which contains therein a white reinforcing agent.

10. A rubber composition as claimed in claim 1, wherein said polypropylnaphthalene is obtained by treating naphthalene or a naphthalene fraction having a boiling point of 200° to 250°C with propylene.

11. A rubber composition as claimed in claim 1, wherein said nonstaining aromatic hydrocarbon oil consists of said polypropylnaphthalene of said general formula.

* * * * *